US008165730B2

(12) United States Patent
Winterhalter et al.

(10) Patent No.: US 8,165,730 B2
(45) Date of Patent: Apr. 24, 2012

(54) FLIGHT RECORDER HAVING INTEGRAL RESERVE POWER SUPPLY WITHIN FORM FACTOR OF ENCLOSURE AND METHOD THEREFOR

(75) Inventors: Michael C. Winterhalter, Nokomis, FL (US); Glenn C. Wilson, Bradenton, FL (US)

(73) Assignee: L-3 Communications Corporation, New York, NY (US)

( * ) Notice: Subject to any disclaimer, the term of this patent is extended or adjusted under 35 U.S.C. 154(b) by 775 days.

(21) Appl. No.: 12/142,129

(22) Filed: Jun. 19, 2008

(65) Prior Publication Data

US 2009/0319102 A1 Dec. 24, 2009

(51) Int. Cl.
*B64D 47/00* (2006.01)

(52) U.S. Cl. .............................................. 701/3; 701/35

(58) Field of Classification Search ........................ None
See application file for complete search history.

(56) References Cited

U.S. PATENT DOCUMENTS 3,140,874 A 7/1964 Ames, Jr Henry
4,644,494 A 2/1987 Muller
4,951,263 A * 8/1990 Shope ............................... 367/2
5,218,366 A 6/1993 Cardamone et al.
5,517,199 A 5/1996 DiMattei
H1560 H 7/1996 Gill et al.
RE35,590 E * 8/1997 Bezos et al. ............... 455/456.1
6,153,720 A * 11/2000 Olzak et al. ................... 528/182
6,275,164 B1 8/2001 MacConnell et al.
6,410,995 B1 6/2002 Grouse et al.
6,424,884 B1 7/2002 Brooke, Jr. et al.
6,741,896 B1 5/2004 Olzak et al.
7,208,685 B2 4/2007 Browning et al.
2002/0035416 A1* 3/2002 De Leon ......................... 701/14
2003/0152145 A1 8/2003 Kawakita
2004/0230352 A1 11/2004 Monroe
2009/0112381 A1* 4/2009 Schwinn et al. ................ 701/14
2009/0277683 A1 11/2009 Winterhalter et al.
2009/0319102 A1 12/2009 Winterhalter et al.
2009/0322521 A1 12/2009 Jacobson
2010/0063654 A1 3/2010 Winterhalter et al.
2010/0073493 A1 3/2010 Godfrey et al.

OTHER PUBLICATIONS http://www.ntsb.gov/aviation; Cockpit Voice Recorders (CVR) and Flight Data Recorders (FDR); Reviewed Sep. 2004.*
Feasibility of Battery Backup for Flight Recorders; Schofield, D.W.; Intl. Symposium on Transportation Recorders; May 3-5, 1999; Arlington, VA.*

* cited by examiner

*Primary Examiner* — Michael J. Zanelli
(74) *Attorney, Agent, or Firm* — Fox Rothschild, LLP; Robert J. Sacco

(57) ABSTRACT

A flight recorder includes an enclosure having a notch formed on one side or corner of the enclosure. An electronic interface is disposed within the enclosure. The electronic interface is coupled for receiving flight data, video data, and audio data. A memory unit is disposed within the enclosure and electrically connected to the electronic interface for storing the data. The memory unit contains a non-volatile memory device. A reserve power supply is physically disposed within the notch of the enclosure. The reserve power supply contains a rechargeable battery. A clamp secures the reserve power supply to the enclosure to make the reserve power supply removable from the enclosure. The reserve power supply has an electrical connector coupled to the enclosure for providing an operating voltage to the electronic interface and memory unit. The reserve power supply and electrical connector physically reside within a form factor of the enclosure.

22 Claims, 5 Drawing Sheets

FLIGHT RECORDER HAVING INTEGRAL RESERVE POWER SUPPLY WITHIN FORM FACTOR OF ENCLOSURE AND METHOD THEREFOR

FIELD OF THE INVENTION

The present invention relates in general to avionics and, more particularly, to a flight recorder having integral reserve power supply physically disposed within a form factor of the enclosure.

BACKGROUND OF THE INVENTION

Most commercial and military aircraft, as well as many civilian aircraft, carry flight data recorders (FDRs) or cockpit voice recorders (CVRs). During normal flight operations, the FDR records specific aircraft performance parameters, such as air speed, altitude, vertical acceleration, time, magnetic heading, control-column position, rudder-pedal position, control-wheel position, horizontal stabilizer, and fuel flow. The CVR records cockpit voices and other audio such as conversations between ground control and flight crew. The FDR and CVR have an enclosure containing electronic interface and processing circuits and a crash survivable memory unit (CSMU). The CSMU contains non-volatile memory for storing the flight data and voice data.

In the event of a crash, most of the flight recorder chassis and inner components may be damaged. However, the CSMU is designed to survive the impact, potential ensuing fire, and aftermath of various environmental conditions. For example, under the EUROCAE ED-112 standard, the flight recorder is required to withstand an impact of 3600 g and temperatures up to 1000° C. The data stored on the CSMU should still be recoverable.

Popularly known as the "black box" and regulated by International Civil Aviation Organization (ICAO), these units are crucial in investigating and understanding aircraft accidents. In fact, the recovery of the black box is second only to the recovery of survivors and victims. FDRs can also be used to study air safety issues, material degradation, unsafe flying procedures, and jet engine performance. The outer housing of the flight recorder is painted bright orange for ready identification and generally located in the tail section of the aircraft to maximize survivability.

The flight recorder receives electrical operating power from the main aircraft power bus. In an emergency condition, the main aircraft power bus may be disabled, which could cause loss of critical data in the moments before a crash. Accordingly, an auxiliary power supply is typically used to provide short term operating power for the flight recorder should the main aircraft power bus become disabled. The auxiliary power source is a separate unit which is wired to the flight recorder. U.S. Pat. No. 6,410,995 discloses this two-unit approach, i.e., CVR and separate auxiliary power supply.

The separate auxiliary power supply associated with prior art flight recorders has certain disadvantages. The FDR and CVR have specific dimensional space requirements imposed by various governing bodies. The separate auxiliary power supply requires additional space well beyond the dimensional specifications of the flight recorder itself. In addition, the two-unit approach (flight recorder and separate auxiliary power supply) increases maintenance, service, and replacement costs.

SUMMARY OF THE INVENTION

A need exists for a reserve power supply that does not exceed the dimensional specifications of the flight recorder.

In one embodiment, the present invention is a flight recorder comprising an enclosure having a notch. An electronic interface is disposed within the enclosure. The electronic interface is coupled for receiving data. A memory unit is disposed within the enclosure and electrically coupled to the electronic interface for storing the data. A reserve power supply is physically disposed within the notch of the enclosure. The reserve power supply has an electrical connector coupled to the enclosure for providing an operating voltage to the electronic interface and memory unit. The physical dimensions of the reserve power supply and electrical connector are disposed within a form factor of the enclosure.

In another embodiment, the present invention is a data recorder comprising an enclosure and electronic interface disposed within the enclosure. The electronic interface is coupled for receiving data. A memory unit is electrically coupled to the electronic interface for storing the data. A reserve power supply is physically disposed within a form factor of the enclosure. The reserve power supply provides an operating voltage to the electronic interface and memory unit.

In another embodiment, the present invention is an aircraft comprising an airframe and flight recorder mounted to the airframe. The flight recorder includes an enclosure and electronic interface disposed within the enclosure. The electronic interface is coupled for receiving data. The flight recorder further includes a memory unit electrically coupled to the electronic interface for storing the data, and a reserve power supply physically disposed within a form factor of the enclosure. The reserve power supply provides an operating voltage to the electronic interface and memory unit.

In another embodiment, the present invention is a method of making a data recorder comprising the steps of providing an enclosure having a notch, disposing an electronic interface within the enclosure, disposing a memory unit within the enclosure, electrically connecting the memory unit to the electronic interface, and disposing a reserve power supply physically within the notch of the enclosure. The reserve power supply is coupled for providing an operating voltage to the electronic interface and memory unit.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
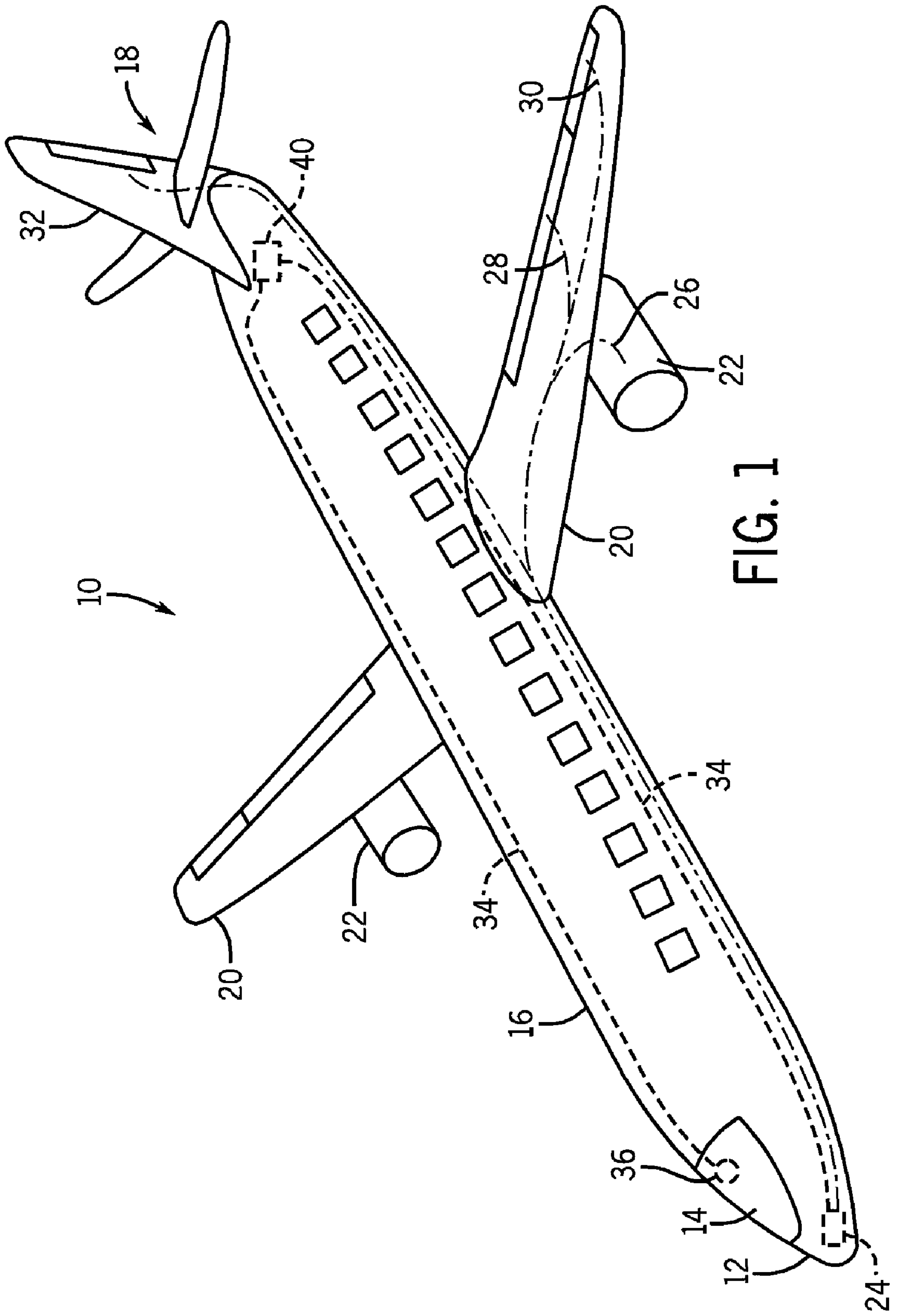
FIG. 1 is a perspective view of an aircraft with a flight recorder.

Referring now to the drawings, and more particularly to FIG. 1, a commercial aircraft 10 is shown with nose section 12, cockpit 14, fuselage or airframe 16, tail section 18, wings 20, and engines 22. A flight data acquisition unit 24 can be positioned in nose 12 to acquire flight information, such as air speed, altitude, vertical acceleration, time, magnetic heading, control-column position, rudder-pedal position, control-wheel position, wing flap position, horizontal stabilizer, fuel flow, and landing gear position, from corresponding sensors located throughout aircraft 10. Sensors are placed on critical surfaces and system components of the aircraft to convert real-time physical flight measurements into electrical signals for flight data acquisition unit 24. Typical aircraft sensors include engine speed sensor 26, wing flap position sensor 28, aileron position sensor 30, and rudder position sensor 32. Aircraft sensors 26-32 can be connected to flight data acquisition unit 24 through a fly-by-wire data bus 34 or wireless channel. Other flight related information, e.g., audio and video data, is collected by audio/video recorder 36 which can be located in the cockpit, passenger area, cargo hold, and landing gear compartment. The flight data acquisition unit 24 and audio/video recorder 36 route flight related information to flight recorder 40 by data bus 34, direct link, or wireless transmission. Flight recorder 40 is mounted to airframe 16. Flight recorder 40 can be implemented as a flight data recorder (FDR), cockpit voice recorder (CVR), cockpit voice and flight data recorder (CVDR), or other combination flight data and audio/video recorder.

Figure 2A:
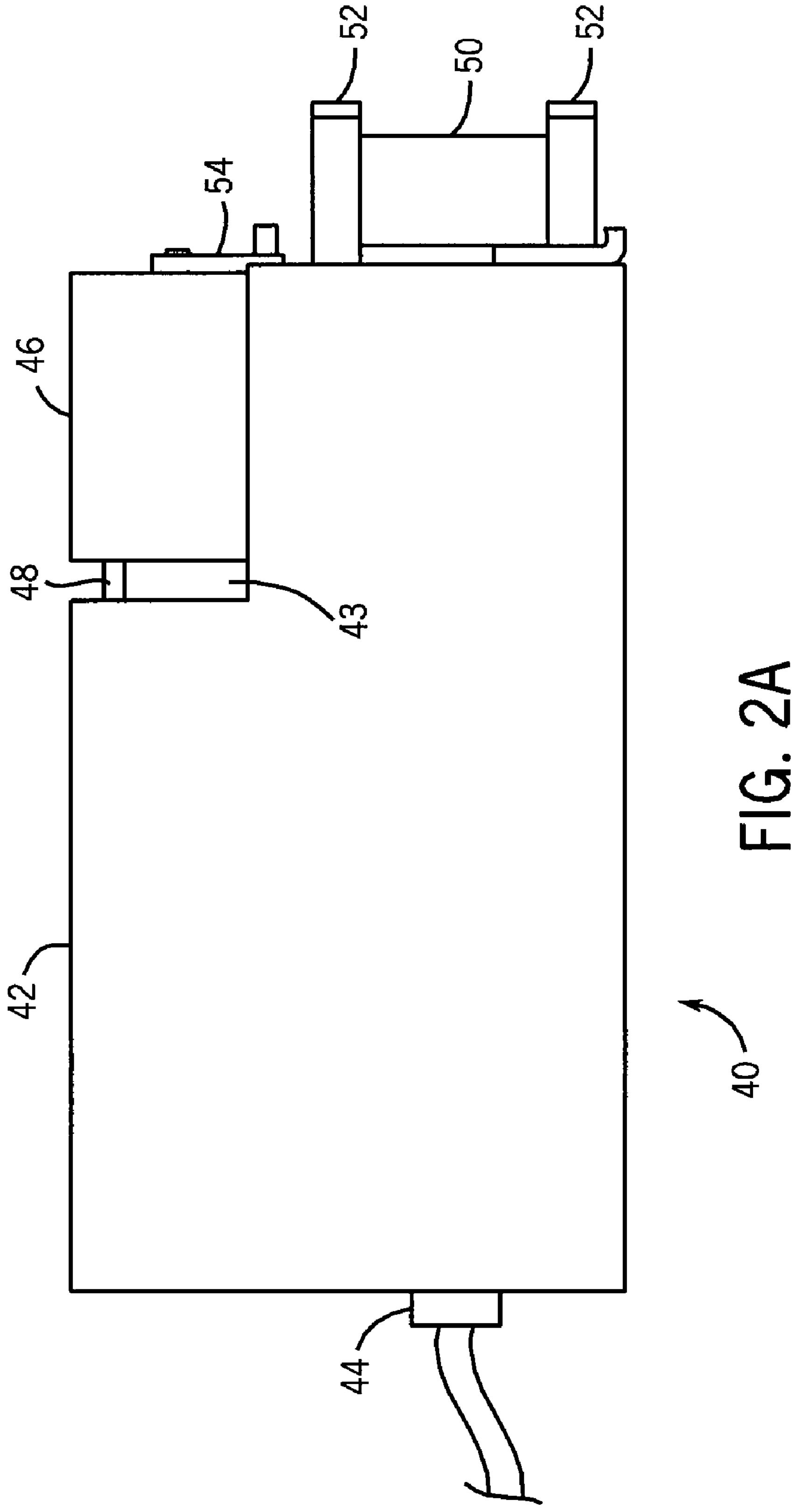
FIG. 2*a*-2*b* show an enclosure for the flight recorder with an integral reserve power supply physically residing within a form factor of the enclosure.
Figure 2B:
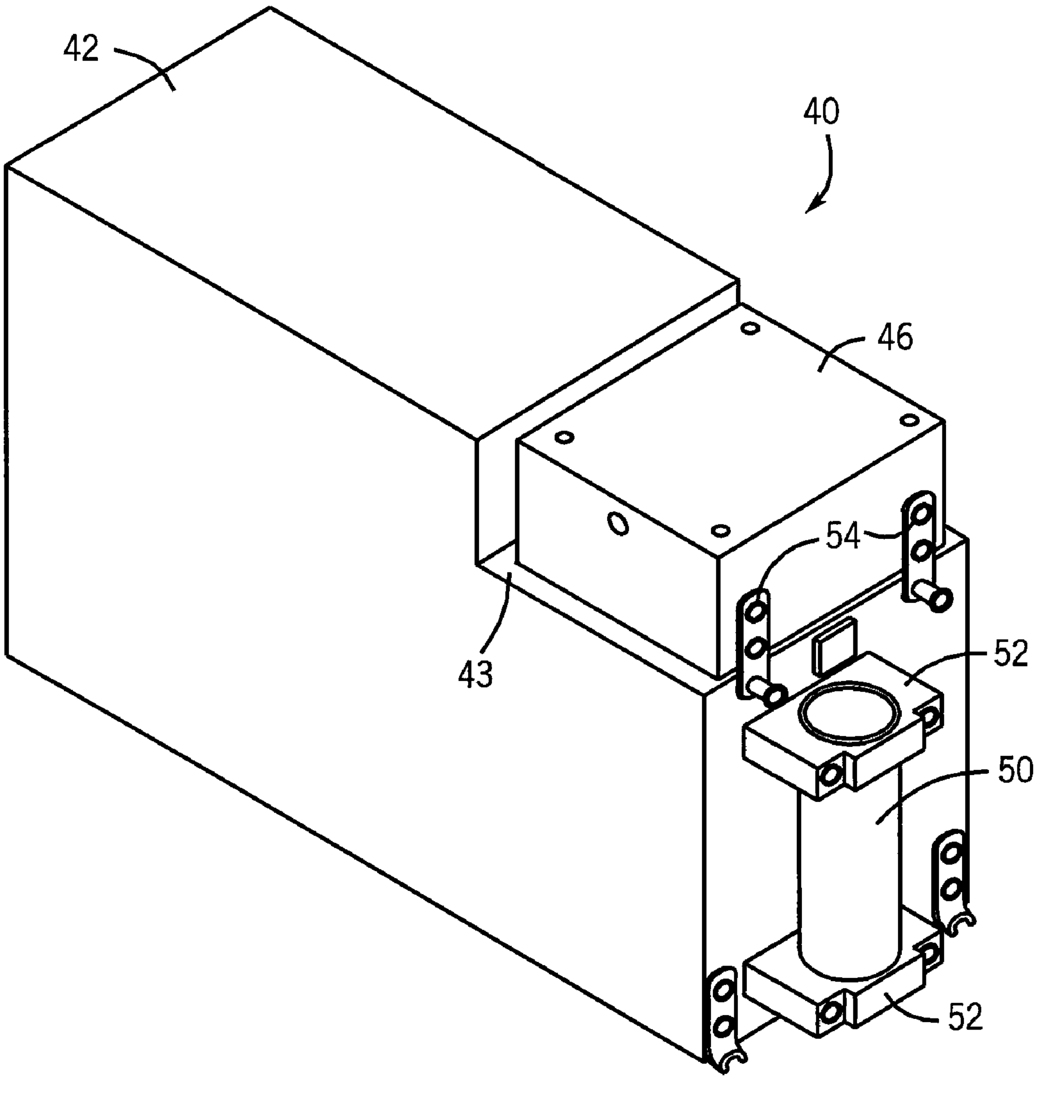

Further detail of flight recorder 40 is shown in FIGS. 2*a* and 2*b*. FIG. 2*a* is a side view; FIG. 2*b* is a perspective view of flight recorder 40. Flight recorder 40 records flight data and audio/video data. Flight recorder 40 is a line replaceable unit that simultaneously records audio, video, controller pilot data link communication (CPDLC) messages, and flight data. Flight recorder 40 includes a compact, lightweight, environmentally sealed enclosure 42 with electrical connector 44 for receiving flight related information from flight data acquisition unit 24 and audio/video recorder 36 via data bus 34, direct link, or wireless transmission. In one embodiment, connector 44 is a 57-pin, DPXB-style connector with a data rate of 1024 words per second. Enclosure 42 is a ½-ATR short, waterproof case which is compliant with ARINC 404A. Enclosure 42 has a generally rectangular form factor with an L-shaped notch or cut-out 43 formed along one side or corner of the case. Notch 43 can also be U-shaped and disposed in a mid-section of any surface of enclosure 42.

A recorder independent power supply (RIPS) 46 is a self-contained battery-pack module that is mounted to and physically resides within notch 43 of enclosure 42. RIPS 46 is secured to enclosure 42 by electrical connector 48 and mechanical clamps 54. RIPS 46 provides a reserve operating voltage and electrical power to printed circuit boards (PCB) and electronic components located within enclosure 42 by way of electrical connector 48. RIPS 46 typically uses nickel cadmium (NiCd) or lithium ion (Li-Ion) batteries. RIPS 46 is recharged from the aircraft power bus or flight recorder main power supply. RIPS 46 is capable of providing 28 VDC at 12 watts (W) for about 10.5 minutes.

RIPS 46 and electrical connector 48 are integral components of flight recorder 40. The physical dimensions of RIPS 46 and electrical connector 48 are disposed within the generally rectangular form factor of the single enclosure 42. That is, RIPS 46 and electrical connector 48 physically reside within the dimensions of notch 43 and provide flight recorder 40 with reserve operating power without increasing its form factor. In other embodiments, RIPS 46 and electrical connector 48 can be placed inside enclosure 42. In any case, the enclosure 42 of flight recorder 40, including integral RIPS 46 and electrical connector 48, is compliant with the dimensional specifications for flight recorders mandated by governing bodies, e.g., TSO 123b and 124b, EUROCAE ED-112, ARINC 747, and ARINC 757.

Light-emitting underwater locator beacon 50 is mounted to enclosure 42 with clamps 52. Beacon 50 serves to locate and retrieve flight recorder 40 in the event of a crash or other aircraft incident.

Figure 3:
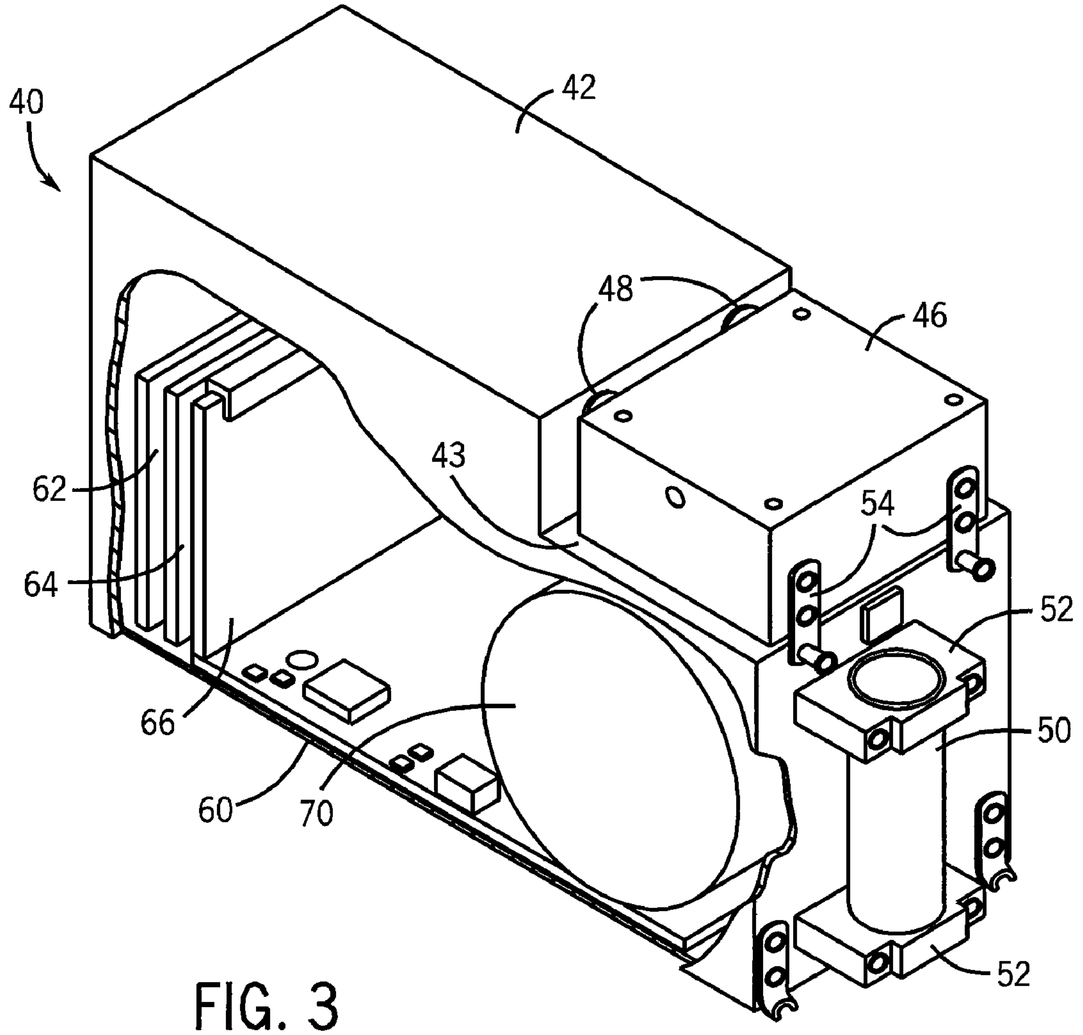
FIG. 3 is a cut-away view of the flight recorder with the integral reserve power supply.

FIG. 3 is a cut-away view of flight recorder 40 showing internal PCBs and other electronic components, such as acquisition processor board 60, audio compression board 62, video compression board 64, and aircraft interface board 66. A crash survivable memory unit (CSMU) 70 is electrically connected to PCBs 60-66 for receiving and storing the flight related information, including flight data and audio/video data. CSMU 70 contains a non-volatile memory device which can be implemented as stacked memory cards having solid state flash memory chips, or other non-volatile storage devices such as magnetic or optical mass storage medium. CSMU 70 is constructed for non-pressurized and non-temperature-controlled applications and compliant with the environmental requirements of DO-160F. The outer housing of CSMU 70 is a heat resistant material such as stainless steel. A thermal insulating layer is disposed between the outer housing and non-volatile memory device. Enclosure 42 is painted international orange for ready identification.

Figure 4:
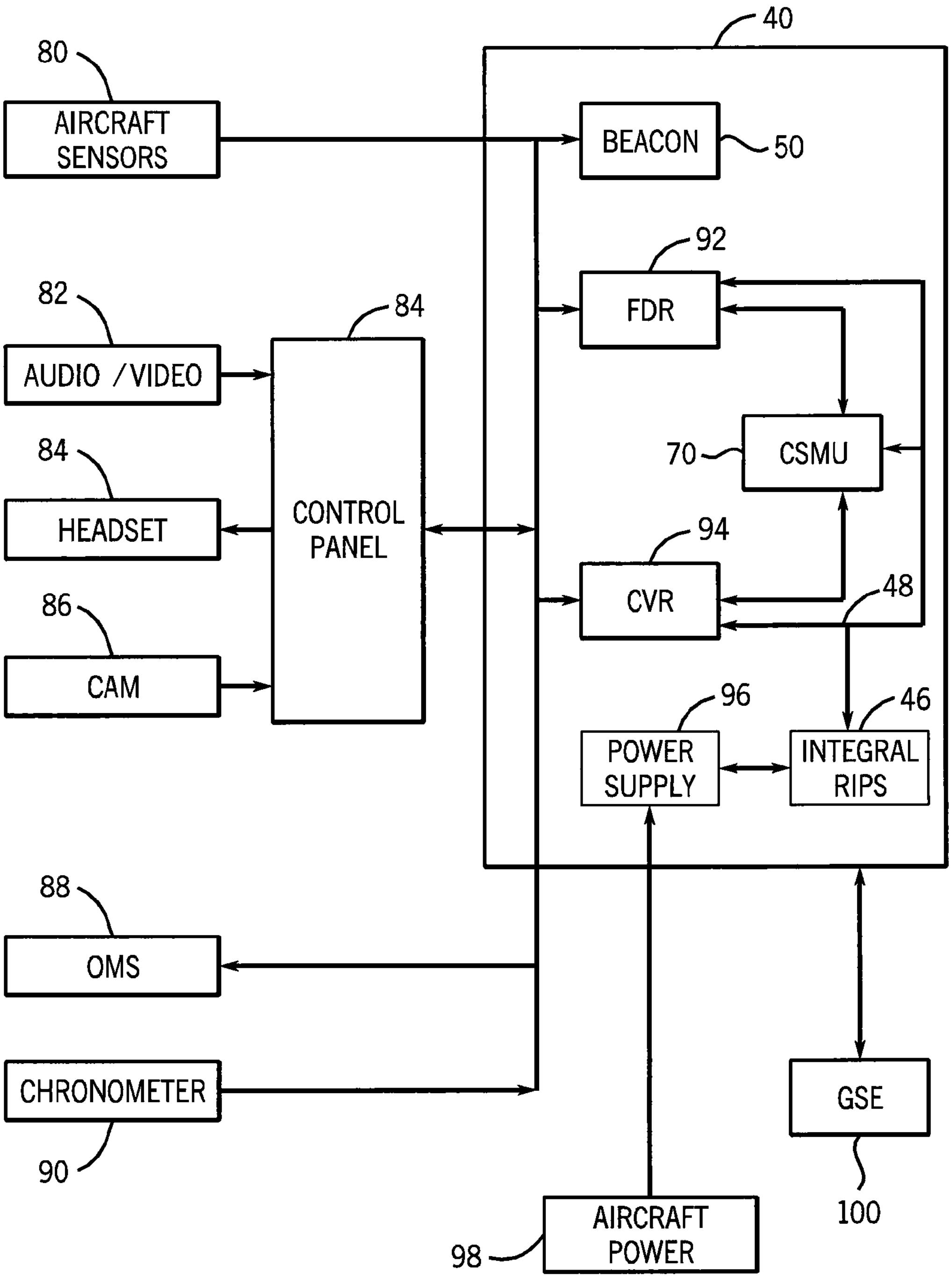
FIG. 4 is a functional block diagram of the aircraft interface to the flight recorder with the integral reserve power supply.

FIG. 4 is a block diagram of the flight data acquisition and recorder system. During normal flight operations, flight recorder 40 records specific aircraft performance parameters and stores the flight information on CSMU 70. For example, aircraft sensors 80 collect flight data from aircraft surfaces and major system components, as described in FIG. 1. The sensor data is routed to flight recorder 40. Audio and video data 82, e.g., from microphone and camera, is routed to control panel 84 which is typically located in the cockpit. Control panel 84 is a user interface to flight recorder 40, including control switches, jacks, and indicators that show erase complete status, test complete status, headset jack, CAM input, erase switch, and test switch. Headset 84 and cockpit area microphone (CAM) 86 for the crew also connect to control panel 84. On-board maintenance system (OMS) 88 and chronometer or timer 90 also connect to flight recorder 40.

Flight recorder 40 includes beacon 50, FDR electronic components 92, CVR electronic components 94, and CSMU 70. Flight recorder 40 may further include an electronic interface for any combination of audio, video, and flight data. The flight information, as well as audio/video data, are processed through the electronic components and stored on CSMU 70 for later analysis in the event of a crash or other significant event. The flight data can also be used to study air safety issues, material degradation, unsafe flying procedures, and jet engine performance.

In one embodiment, flight recorder 40 simultaneously records four separate channels of cockpit audio, converts the audio to a digital format, and stores the data in memory. Flight recorder 40 records two hours of high quality audio from the four cockpit audio inputs: (1) cockpit spare audio input (3rd crew member, public address system), (2) co-pilot's audio, boom, mask, and hand-held microphone input, (3) pilot's audio, boom, mask and hand-held microphone input, and (4) CAM input. The audio inputs are conditioned, amplified, and equalized as necessary. The resulting signals are converted to digital pulse code modulation (PCM) data. Pre-amplification and automatic gain control for interfacing the cockpit area microphone with flight recorder 40 is processed internally, thus eliminating the need for a cockpit control unit. The flight data from aircraft sensors 80 is received, buffered, and stored in CSMU 70, logically separate from the cockpit audio and video data. CSMU 70 has capacity for twenty-five hours of flight data and audio/video data.

In normal operation, power supply 96 receives electric power from aircraft power bus 98 in the form of 28 volts direct current (VDC) or 115 volts alternating current (VAC). Power supply 96 provides normal operating power for FDR electronic components 92, CVR electronic components 94, and CSMU 70. Beacon 50 has its own battery which can last for years upon activation.

In the event that aircraft power bus 98 is disabled or power supply 96 fails, e.g., in the moments prior to a crash, flight recorder 40 initiates a backup operation to update and store data on CSMU 70. The backup process can require up to 10 minutes to complete. RIPS 46 provides the reserve electrical operating power for flight recorder 40 during the backup process. FIG. 4 shows electrical connector 48 coupled to FDR electronic components 92, CVR electronic components 94, and CSMU 70 for providing a reserve operating voltage for these components. At the conclusion of backup, RIPS 46 shuts off and does not start again until aircraft power bus 98 is restored. Flight recorder 40 records the event that a backup has occurred using a cycle counter. If aircraft power 98 is restored prior to the end of the backup process, RIPS 46 returns to standby mode and begins re-charging without incrementing the cycle counter. RIPS 46 is recharged by power supply 96 or aircraft power bus 98 and can function for up to 4000 backup cycles before replacement. RIPS 46 reports failure of the internal battery pack. RIPS 46 is modular, removable, and replaceable by way of electrical connector 48 and clamps 54.

RIPS 46 is an integral component of flight recorder 40 and requires no special connectors, wiring, space allocation, or other modifications to existing systems to provide the reserve power supply to the flight recorder. RIPS 46 and electrical connector 48 physically reside within the form factor of enclosure 42 and do not require any space beyond the dimensional specifications for flight recorders. RIPS 46 is therefore independent from the main aircraft power source and wiring.

Ground support equipment (GSE) 100 is connected to flight recorder 40 for maintenance, diagnostics, status, and data retrieval from CSMU 70. GSE 100 uses an Ethernet interface or other electronic communication protocol to external equipment such as a computer.

Flight recorder 40 is applicable to fixed wing and rotor aircraft, including commercial jets, military aircraft, drones, ultra-light aircraft, blimps, balloons, and flying wings. Flight recorder 40 can also be adapted to marine transportation systems such as boats, submarines, hovercraft, also spanning to pleasure/recreational, scientific, commercial, land-based vehicles, and space travel.

While one or more embodiments of the present invention have been illustrated in detail, the skilled artisan will appreciate that modifications and adaptations to those embodiments may be made without departing from the scope of the present invention as set forth in the following claims.

What is claimed:

1. A flight recorder, comprising:

an enclosure having an inwardly extending notch formed in an outer peripheral surface thereof, said notch sized and shaped to receive at least a reserve power supply;

an electronic interface disposed within the enclosure, the electronic interface being coupled for receiving data;

a memory unit disposed within the enclosure and electrically coupled to the electronic interface for storing the data; and said reserve power supply physically and removably disposed within the notch and external to the enclosure, the reserve power supply having an electrical connector coupled to a mating electrical connecter of the enclosure for providing an operating voltage to the electronic interface and memory unit, wherein physical dimensions of the reserve power supply and the electrical connector are disposed within a form factor which is pre-defined for said data recorder by an applicable standard.

2. The flight recorder of claim 1, further including a clamp for securing the reserve power supply to the enclosure.

3. The flight recorder of claim 1, wherein the memory unit includes a non-volatile memory device.

4. The flight recorder of claim 1, further including a battery disposed in the reserve power supply.

5. The flight recorder of claim 1, wherein the memory unit stores flight data, audio data, or video data.

6. The flight recorder of claim 1, further including a beacon mounted to the enclosure.

7. A data recorder, comprising:

an enclosure having an inwardly extending notch formed in an outer peripheral surface thereof, said notch sized and shaped to receive at least a reserve power supply;

an electronic interface disposed within the enclosure, the electronic interface being coupled for receiving data;

a memory unit electrically coupled to the electronic interface for storing the data; and said reserve power supply physically disposed within the notch and external to the enclosure, wherein physical dimensions of the reserve power supply are disposed within a form factor which is pre-defined for said data recorder by an applicable standard, the reserve power supply providing an operating voltage to the electronic interface and memory unit.

8. The data recorder of claim 7, further including a clamp for securing the reserve power supply to the enclosure.

9. The data recorder of claim 7, wherein the reserve power supply is removable from the enclosure.

10. The data recorder of claim 7, further including a battery disposed in the reserve power supply.

11. The data recorder of claim 7, wherein the memory unit stores flight data, audio data, or video data.

12. An aircraft, comprising:

an airframe; and a flight recorder mounted to the airframe, the flight recorder including (a) an enclosure having an inwardly extending notch formed in an outer peripheral surface thereof, the notch sized and shaped to receive at least a reserve power supply, (b) an electronic interface disposed within the enclosure, the electronic interface being coupled for receiving data, (c) a memory unit electrically coupled to the electronic interface for storing the data, and (d) said reserve power supply physically disposed within the notch and external to the enclosure, wherein physical dimensions of the reserve power supply are disposed within a form factor which is pre-defined for said data recorder by an applicable standard, the reserve power supply providing an operating voltage to the electronic interface and memory unit.

13. The aircraft of claim 12, further including a clamp for securing the reserve power supply to the enclosure.

14. The aircraft of claim 12, wherein the reserve power supply is removable from the enclosure.

15. The aircraft of claim 12, further including a battery disposed in the reserve power supply.

16. The aircraft of claim 12, wherein the memory unit stores flight data, audio data, or video data.

17. A method of making a data recorder, comprising:

providing an enclosure having an inwardly extending notch formed in an outer peripheral surface thereof, said notch sized and shaped to receive at least a reserve power supply;

disposing an electronic interface within the enclosure;

disposing a memory unit within the enclosure;

electrically connecting the memory unit to the electronic interface; and disposing said reserve power supply physically within the notch and external to of the enclosure, the reserve power supply being coupled to said data recorder for providing an operating voltage to the electronic interface and memory unit.

18. The method of claim 17, further including securing the reserve power supply to the enclosure.

19. The method of claim 17, further including removing the reserve power supply from the enclosure.

20. The method of claim 17, further including disposing a battery in the reserve power supply.

21. The method of claim 17, further including disposing a non-volatile memory device in the memory unit.

22. The method of claim 17, wherein the memory unit stores flight data, audio data, or video data.

* * * * *